(12) United States Patent
Bott et al.

(10) Patent No.: US 10,112,856 B2
(45) Date of Patent: Oct. 30, 2018

(54) METHOD AND APPARATUS FOR WASTEWATER TREATMENT USING GRAVIMETRIC SELECTION

(71) Applicants: Hampton Roads Sanitation District, Virginia Beach, VA (US); D.C. Water & Sewer Authority, Washington, DC (US)

(72) Inventors: Charles Bott, Virginia Beach, VA (US); Maureen O'Shaughnessy, Herndon, VA (US); Bernhard Wett, Innsbruck (AT); Sudhir Murthy, Washington, DC (US)

(73) Assignees: Hampton Roads Sanitation District, Virginia Beach, VA (US); D.C. Water & Sewer Authority, Washington, DC (US)

(*) Notice: Subject to any disclaimer, the term of this patent is extended or adjusted under 35 U.S.C. 154(b) by 0 days.

(21) Appl. No.: 15/003,491

(22) Filed: Jan. 21, 2016

(65) Prior Publication Data
US 2016/0137537 A1 May 19, 2016

Related U.S. Application Data

(62) Division of application No. 14/092,499, filed on Nov. 27, 2013, now Pat. No. 9,242,882.
(Continued)

(51) Int. Cl.
*C02F 3/12* (2006.01)
*B01D 21/00* (2006.01)
(Continued)

(52) U.S. Cl.
CPC ............ *C02F 3/1205* (2013.01); *B01D 21/00* (2013.01); *B01D 21/2488* (2013.01);
(Continued)

(58) Field of Classification Search
None
See application file for complete search history.

(56) References Cited

U.S. PATENT DOCUMENTS

| 3,226,317 A | 12/1965 | Albertson |
| 3,468,794 A | 9/1969 | Amero |

(Continued)

FOREIGN PATENT DOCUMENTS

| CN | 101568493 A | 10/2009 |
| CN | 102209689 | 10/2011 |

(Continued)

OTHER PUBLICATIONS

Chudoba et al. "Control of Activated Sludge Filamentous Bulking II. Selection of Microorganisms by Means of a Selector," Water Res., 7, 1389, 1973.
(Continued)

*Primary Examiner* — Chester T Barry
(74) *Attorney, Agent, or Firm* — Leason Ellis LLP (57) ABSTRACT

A method and a system for selecting and retaining solids with superior settling characteristics, the method comprising feeding wastewater to an input of a processor that carries out a treatment process on the wastewater, outputting processed wastewater at an output of the processor, feeding the processed wastewater to an input of a gravimetric selector that selects solids with superior settling characteristics, and outputting a recycle stream at a first output of the gravimetric selector back to the processor.

20 Claims, 6 Drawing Sheets

Related U.S. Application Data (60) Provisional application No. 61/730,196, filed on Nov. 27, 2012.

(51) Int. Cl.
    *B01D 21/24*     (2006.01)
    *B01D 21/26*     (2006.01)
    *C02F 1/38*     (2006.01)
    *C02F 9/00*     (2006.01)
    *C02F 3/28*     (2006.01)
    *C02F 1/00*     (2006.01)

(52) U.S. Cl.
CPC ......... *B01D 21/262* (2013.01); *B01D 21/267* (2013.01); *C02F 1/385* (2013.01); *C02F 3/12* (2013.01); *C02F 3/1221* (2013.01); *C02F 3/1268* (2013.01); *C02F 9/00* (2013.01); *C02F 3/1273* (2013.01); *C02F 3/2813* (2013.01); *C02F 2001/007* (2013.01); *C02F 2203/004* (2013.01); *C02F 2301/046* (2013.01); *C02F 2303/24* (2013.01); *Y02W 10/12* (2015.05); *Y02W 10/15* (2015.05)

(56) References Cited

U.S. PATENT DOCUMENTS

| | | | |
|---|---|---|---|
| 4,056,465 A | 11/1977 | Spector | |
| 4,415,452 A | 11/1983 | Heil et al. | |
| 4,891,136 A | 1/1990 | Voyt | |
| 5,582,733 A | 12/1996 | Desbos et al. | |
| 5,645,799 A * | 7/1997 | Shah | C02F 1/5209 210/709 |
| 5,863,435 A | 1/1999 | Heijnen et al. | |
| 6,183,642 B1 | 2/2001 | Heijnen et al. | |
| 6,309,547 B1 | 10/2001 | Burke | |
| 6,383,390 B1 | 5/2002 | Van Loosdrecht et al. | |
| 6,406,617 B1 | 6/2002 | Brauchli | |
| 6,566,119 B1 | 5/2003 | Heijnen et al. | |
| 6,605,220 B2 | 8/2003 | Garcia et al. | |
| 6,645,386 B1 * | 11/2003 | Moreau | B01D 21/01 210/711 |
| 7,060,185 B2 | 6/2006 | Kim et al. | |
| 7,273,553 B2 | 9/2007 | Van Loosdrecht et al. | |
| 7,481,934 B2 | 1/2009 | Skillicorn | |
| 7,569,147 B2 | 8/2009 | Curtis et al. | |
| 7,604,740 B2 | 10/2009 | Baur | |
| 7,846,334 B2 | 12/2010 | Wett | |
| 8,157,988 B2 | 4/2012 | Quevillon | |
| 8,268,169 B2 | 9/2012 | Lean et al. | |
| 8,623,205 B2 * | 1/2014 | Woodard | C02F 3/2846 210/173 |
| 2001/0033527 A1 * | 10/2001 | Smith | B01F 5/0619 366/337 |
| 2001/0045382 A1 | 11/2001 | Nasr | |
| 2003/0232107 A1 * | 12/2003 | Terry | A23K 40/10 426/2 |
| 2005/0087480 A1 | 4/2005 | Park et al. | |
| 2007/0000836 A1 | 1/2007 | Elefritz et al. | |
| 2007/0217856 A1 * | 9/2007 | Kott | A46B 9/005 401/48 |
| 2007/0241041 A1 * | 10/2007 | Shimamura | C02F 11/127 210/197 |
| 2008/0210613 A1 * | 9/2008 | Wechsler | B03D 1/1431 210/170.05 |
| 2008/0217212 A1 * | 9/2008 | Garner | B03B 5/34 208/390 |
| 2008/0217244 A1 * | 9/2008 | Gaid | B01D 21/0012 210/636 |
| 2008/0223789 A1 | 9/2008 | Hasan et al. | |
| 2009/0221054 A1 | 9/2009 | Wett | |
| 2009/0221854 A1 | 9/2009 | Oevering et al. | |
| 2009/0272690 A1 | 11/2009 | Wett | |
| 2009/0282882 A1 | 11/2009 | Verhave et al. | |
| 2010/0170845 A1 | 7/2010 | Baur | |
| 2010/0288693 A1 | 11/2010 | Vion et al. | |
| 2011/0000851 A1 * | 1/2011 | Vanotti | C02F 3/341 210/620 |
| 2011/0198284 A1 | 8/2011 | Nyhuis | |
| 2012/0048802 A1 | 3/2012 | Brown et al. | |
| 2012/0305477 A1 * | 12/2012 | Stroot | B01D 21/245 210/605 |
| 2013/0028841 A1 * | 1/2013 | Yagi | A61J 1/20 424/9.1 |
| 2014/0144836 A1 | 5/2014 | Nyhuis et al. | |
| 2014/0202333 A1 * | 7/2014 | Pomerleau | B04C 9/00 95/268 |
| 2015/0336826 A1 * | 11/2015 | Peeters | C02F 3/104 210/616 |

FOREIGN PATENT DOCUMENTS

| | | |
|---|---|---|
| EP | 0544226 | 6/1993 |
| EP | 0872451 B1 | 12/2002 |
| EP | 1634854 | 3/2006 |
| EP | 1634855 | 3/2006 |
| GB | 2228930 | 9/1990 |
| JP | 58-104696 | 6/1983 |
| JP | H08257583 | 10/1996 |
| JP | 2001096297 | 4/2001 |
| JP | 2003010874 | 1/2003 |
| JP | 2008284427 A | 11/2008 |
| JP | 2012501845 | 1/2012 |
| JP | 2012501845 A | 1/2012 |
| RU | 2454374 C2 | 6/2012 |
| WO | 2010055776 A1 | 5/2010 |
| WO | WO-2010055776 A1 * | 5/2010 |
| WO | 2012019310 | 2/2012 |
| WO | 2014085662 | 6/2014 |

OTHER PUBLICATIONS

Gabb et al. "The Selector Effect on Filamentous Bulking in Long Sludge Age Activated Sludge Systems," Water Sci. Technol., 23(2-6), 867, 1991.

Jenkins et al. "Manual on the Causes and Control of Activated Sludge Bulking, Foaming, and Other Solids Separation Problems," 3rd edition, Lewis Publishers, USA, 2004.

Marshall et al. "Selectors in Pulp and Paper Mill-activated Sludge Operations: Do they work?" Pulp and Paper Canada, 101(3), 48-53, 2000.

Lebek et al. "Control of the Growth of Microthrix parvicella by Using an Aerobic Selector—Results of Pilot and Full Scale Plant Operation," Water Sci. Technol., 46(1-2), 2002.

Marten et al. "Full-scale evaluation of factors affecting the performance of anoxic selectors," Water Environ. Res., 69 (7), 1272-1289, 1997.

Parket et al. "Discussion of: Full-scale evaluation of factors affecting the performance of anoxic selectors," Water Environ. Res., 70 (6), 1225-1228, 1998.

Schuler et al., "Microbial storage products, biomass density, and settling properties of enhanced biological phosphorus removal activated sludge," Water Sci. Technol., 4, 2001.

Davoli et al. "Testing the effect of selectors in the control of bulking and foaming in small activated sludge plants," Water Sci Technol. 46(1-2):495-8, 2002.

Parket et al. "Making classifying selectors work for foam elimination in the activated sludge process," Water Environ. Res., 75 (1), 83-91, 2003.

Morgenroth et al. "Aerobic Granular Sludge in a Sequencing Batch Reactor," Water Research, vol. 31 No. 12 pp. 3191-3194, 1997.

Dangeong Peng et al. "Aerobic Granular Sludge," A Case Report Water Research, vol. 33 No. 3 pp. 890-893, 1999.

Abeling et al. "Anaerobic-Aerobic Treatment of High Strength Ammonium Wastewater—Nitrogen Removal Via Nitrite," Wat. Sci. Tech. vol. 26, No. 5-6, pp. 1007-1015, 1992.

Alleman et al. "Storage-Induced Denitrification Using Sequencing Batch Reactor Operation," Water Research vol. 14. pp. 1483-1488, 1980.

(56) References Cited

OTHER PUBLICATIONS

Anthonisen et al. "Inhibition of Nitrification by Ammonia and Nitrous Acid," Water Pollution Control Federation vol. 28, No. 5, pp. 835-852, 1976.
Daebel et al. "Exploring Temporal Variations of Oxygen Saturation Constants of Nitrifying Bacteria," Water Research 41, pp. 1094-1102, 2007.
Guo et al. "Effective and Robust Partial Nitrification to Nitrite by Real-time Aeration Duration Control in an SBR Treating Domestic Wastewater," Process Biochemistry 44, 2009.
Hanaki et al. "Nitrification at Low Levels of Dissolved Oxygen With and Without Organix Loading in a Suspended-Growth Reactor," Wat. Res. vol. 24, No. 3, pp. 297-302, 1990.
Hellinga et al. "The Sharon Process: An Innovative Method for Nitrogen Removal From Ammonium-Rich Waste Water," Water Science and Technology vol. 37 Issue 9, pp. 135-142, 1998.
Hippen et al. "Aerobic Deamoonification: A New Experience in the Treatment of Wastewaters," Wat. Sci. Tech. vol. 35, No. 10, pp. 111-120, 1997.
Turk et al. "Maintaining Nitrite Build-Up in a System Acclimated to Free Ammonia," Wat. Res. vol. 23, No. 11, pp. 1383-1388, 1989.
Wong-Chong et al. "Kinetics of Microbial Nitrification: Nitrite-Nitrogen Oxidation," Wat. Res. vol. 12. pp. 605-609, 1978.
Yang et al. "Nitrogen Removal via Short-Cut Simultaneous Nitrification and Denitrification in an Intermittently Aerated Moving Bed Membrane Bioreactor," Haz. Mat. 195, 2011.
Yoo et al. "Nitrogen Removal From Synthetic Wastewater by Simultaneous Nitrification and Denitrification and Denitrification via Nitrite in an Intermittently-Aerated Reactor,".
Zeng et al. "Control and Optimization of Nitrifying Communities for Nitritation from Domestic Wastewater at Room Temperature," Enzyme and Microb. Tech. 45, pp. 226-232, 2009.
Gao, et al. "Shortcut nitrification-denitrification by real-time control strategies," Bioresource Technology; journal homepage: www.elsevier.com/locate/biortech; p. 2298-2300.
C.S.Gee, et al. "Nitrite accumulation followed by denitrification using sequencing batch reactor," Water Science and Technology vol. 49 No. 5-6 pp. 47-55.
A.N. Katsogiannis, et al. "Enhanced nitrogen removal in SBRs bypassing nitrate generation accomplished by multiple aerobic/anoxic phase pairs" Water Science and Tech. vol. 47.
Romain Lemaire, et al. "Achieving the Nitrite Pathway Using Aeration Phase Length Control and Step-Feed in an SBR Removing Nutrients from Abattoir Wastewater" Biotechnology.
Manser, et al. "Consequences of mass transfer effects on the kinetics of nitrifiers" Water Research 39 (2005) pp. 4633-4642.
Wett, et al.; Syntrophy of aerobic and anaerobic ammonia oxidisers; Water Science Technology 2010; p. 1915.
Pollice, et al. "Influence of aeration and sludge retention time on ammonium oxidation to nitrite and nitrate" Water Research 36 (2002) pp. 2541-2546.
Sin, et al. "Modelling nitrite in wastewater treatment systems: a discussion of different modelling concepts" Water Science & Technology 58.6 2008 p. 1155-1171.
Sliekers, et al. "Competition and coexistence of aerobic ammonium- and nitrite-oxidizing bacteria at low oxygen concentrations" Environmental Biotechnology Apr. 8, 2005 p. 808-817.
Van Dongen, et al. "The SHARON—Anammox Process for treatment of ammonium rich wastewater" Water Science and Technology vol. 44 No. 1 p. 153-160.
Wett "Solved upscaling problems for implementing deammonification of rejection water" Water Science & Technology vol. 53 No. 12 p. 121-128.
Wett, et al. "Syntrophy of Aerobic and Anaerobic Ammonia Oxidisers" Water Science & Technology—WST 61.8 2010 pp. 1915-1922.
Wyffels, et al. "Nitrogen removal from sludge reject water by a two-stage oxygen-limited autotrophic nitrification denitrification process" Water Science and Technology vol. 49.

Yu, et al. "Performance Enhancement of SBR Applying Real-Time Control" Journal of Environmental Engineering; Oct. 2000 pp. 943-948.
Zekker, et al. "Achieving nitritation and anammox enrichment in a single moving-bed biofilm reactor treating reject water" Environmental Technology, 33:6, 703-710.
Zeng, et al. "Process Control of an Alternating Aerobic-Anoxic Sequencing BAtch Reactor for Nitrogen Removal via Nitrite" Chem. Eng. Technol. 2008, 31, No. 4, 582-587.
Bernet, et al. "Nitrification at Low Oxygen Concentration in Biofilm Reactor" Journal of Environmental Engineering Mar. 2001 pp. 266-271.
Blackburne, et al "Partial nitrification to nitrite using low dissolved oxygen concentration as the main factor" Springer Science+Business Media B.V. 2007.
Ciudad, et al. "Partial nitrification of high ammonia concentration wastewater as a part of a shortcut biological nitrogen removal process" Process Biochemistry 40 (2005) 1715.
Fux, et al. "Biological treatment of ammonium-rich wastewater by partial nitritation and subsequent anaerobic ammonium oxidation (anammox) in a pilot plant" Journal of Biotec.
International Search Report from Related PCT application No. PCT/US13/072345, mailed on Mar. 20, 2014.
Ju et al. "Simulataneous Nitrification, Denitrification, and Phosphorous Removal in Single-Tank Low-Dissolved-Oxygen Systems Under Cyclic Aeration," Water Env. Res., 2007.
Kim et al. "Comparison Study of the Effects of Temperature and Free Ammonia Concentration on Nitrification and Nitrite Accumulation," Process Biochemistry 43, 154-160, 2008.
Kornaros et al. "Partial Nitrification/Denitrification Can be Attributed to the Slow Response of Nitrite Oxidizing Bacteria to Periodic Anoxic Disturbances," Env. Sci., 2008.
Laanbroek et al. "Competition for Limiting Amounts of Oxygen between Nitrosomonas Europaea and Nitrobacter Winogradskyi Grown in Mixed Continuous Cultures," Arch Micro, 1993.
Li et al. "Partial Nitritation of Landfill Leachate with Varying Influent Composition under Intermittent Aeration Conditions," Process Safety and Env. Prot. V 91 Issue 4, 2013.
Ling, "Experience from Commissioning of Full-scale DeAmmon plant at Himmerfjarden," Proceedings of 2nd IWA Specialized Conference, Lemtech Konsulting, ed., pp. 403-410.
Peng et al. "Nitrite Accumulation by Aeration Controlled in Sequencing Batch Reactors Treating Domestic Wastewater," Water Sci. Tech. vol. 50 No. 10 pp. 35-43, 2004.
Peng et al. "Partial Nitrification from Domestic Wastewater by Aeration Control at Ambient Temperature," Chin. J. Chem. Eng., 15(1) 115-121, 2007.
Silverstein et al. "Performance of SBR Activated Sludge Processes with Nitrification/Denitrification," Water Pollution Control Fed., vol. 55, No. 4 pp. 377-384, 1983.
Turk et al. "Preliminary Assessment of a Shortcut in Nitrogen Removal from Wastewater," Canadian Journal of Civil Engineering, vol. 13, Issue 6, 1986.
Search Report for corresponding Chinese Application No. 201380071506.5, dated Feb. 22, 2017.
Water Utilities Technical Assistance Program, "New Mexico Wastewater Systems Operator Certification Study Manual", Utility Operators Certification Program New Mexico Environment Department Surface Water Quality Bureau, Nov. 2007, Version 1.1.
Wett, B. "Development and implementation of a robust deammonification process." Water Science and Technology 56.7 (2007): 81-88.
Chinese Office Action issued in Chinese Application No. 201380071506. 5, dated Aug. 16, 2017.
Russian Office Action issued in Russian Patent Application No. 2015125485, dated Sep. 12, 2017.
Osterreichischer Wasser-Und Abfallwirtschaftsverband, "Klaranlagenzustandsbericht: OWAV 0 Arbeisbehelf Nr. 22", dated Jan. 29, 2001. (With Partial English Translation).

* cited by examiner

METHOD AND APPARATUS FOR WASTEWATER TREATMENT USING GRAVIMETRIC SELECTION

CROSS REFERENCE TO PRIOR APPLICATIONS

This application is a divisional of U.S. patent application Ser. No. 14/092,499, titled "Method and Apparatus for Wastewater Treatment Using Gravimetric Selection," filed Nov. 27, 2013 and issued on Jan. 26, 2016 as U.S. Pat. No. 9,242,882, which is based on and claims priority to and the benefit thereof from U.S. provisional patent application No. 61/730,196, filed Nov. 27, 2012, titled "Method and Apparatus for Wastewater Treatment Using Gravimetric Selection," both of which are hereby incorporated herein by reference in their entireties.

FIELD OF THE DISCLOSURE

The present disclosure relates generally to a method and an apparatus for wastewater treatment and, more specifically, to a method and an apparatus for wastewater treatment with gravimetric selection.

BACKGROUND OF THE DISCLOSURE

Gravity separation is usually used to remove solids associated with the activated sludge process. A methodology has been developed to improve settling of solids by gravimetric selection. This methodology might also be applied to decrease membrane fouling in a membrane bioreactor (MBR) process or to decrease membrane diffuser fouling. There are currently three approaches to select for solids that settle well. The first is strategies within an activated sludge process to select for well settling solids such as by using aerobic and anoxic or anaerobic zones or selectors to improve settling. However, there is a mixed history with the use of these selectors and it does not always work.

The second method includes using shear/agitation in a reactor to select for granular solids that settle well. This selection is also accompanied with an increase in the overflow rate of sludge in the mainstream solid-liquid gravity separator. This selection process is often gradual and tedious, and, since the selector is associated with the mainstream process, it can result in problems associated with meeting permit requirements. In most cases, only a sequencing batch reactor process allows the flexibility to increase over time and modify the overflow rate.

The third method includes selecting and wasting the poor settling foam and entrapped solids, often by collecting and "surface wasting" the foam and solids at the surface of a reactor using "classifying selectors". While this approach was originally intended to reduce foam, it also selectively washes out the solids that do not settle well, as these slow settling solids tend to accumulate near the surface in reactors. Hence, this method retains only the solids that settle well, thereby providing a method that may be useful in deselecting poor settling solids, but which may have limited use in selecting settling solids. In implementing this method the settling characteristics improvements are often inconsistent, as sometimes poor settling solids, if they are produced at rates in excess of, e.g., a classifier surface removal rate, are retained and remain in the sludge.

An unfulfilled need exists for a method and an apparatus for wastewater treatment that does not have the drawbacks of the methods currently used to select and separate solids from wastewater.

SUMMARY OF THE DISCLOSURE

According to an aspect of the disclosure, a method is provided for selecting and retaining solids with superior settling characteristics. The method comprises: feeding wastewater to an input of a processor that carries out a biological treatment process on the wastewater; outputting processed wastewater at an output of the processor; feeding the processed wastewater to an input of a gravimetric selector that selects solids with superior settling characteristics; and outputting a recycle stream at a first output of the gravimetric selector.

The method may further comprise outputting a waste stream at a second output of the gravimetric selector to solids handling, where solids handling includes at least one thickening, stabilizing, conditioning, and dewatering. The waste stream may be rejected and the recycle stream may be returned to the processor. The waste stream may comprise solids with poor settling and filtration characteristics or that have increased potential for membrane fouling.

The method may further comprise supplying the recycle stream from the first output of the gravimetric selector to the processor. The recycle stream may comprise solids with superior settling characteristics.

The treatment process may comprise: a suspended growth activated sludge process; a granular sludge process; an integrated fixed-film activated sludge process; a biological nutrient removal process; an aerobic digestion process; or an anaerobic digestion process.

The treatment process may comprise a biological treatment process. The biological treatment process may comprise an in-line solid-liquid separation process.

The processor may comprise a membrane separator.

The processor may comprise a cyclone that accelerates the wastewater and provides shear-force to the wastewater to separate solids with good settling characteristics from solids with poor settling and filtration characteristics.

The processor may comprise a centrifuge that provides centrifugal and shear force to separate solids with good settling characteristics from solids with poor settling and filtration characteristics in the wastewater.

The feed rate to and a geometry of the cyclone may be configured to adjust a velocity of the wastewater in the cyclone to select for larger or more dense solids or increase a time available for separation in the cyclone.

The process of feeding the processed wastewater to the input of the gravimetric selector may comprise: feeding the processed wastewater to an input of a separator that separates the wastewater into an underflow and effluent; receiving the underflow from the separator; and gravimetrically selecting solids with superior settling characteristics from the underflow and supplying the recycle stream to the first output.

The method may further comprise controlling a velocity of the wastewater in the cyclone so that solids of a predetermined size or density are retained.

The method may further comprise controlling a hydraulic loading rate to select settling solids of a predetermined size or density.

According to a further aspect of the disclosure, an apparatus is provided that selects and retains solids with superior settling characteristics. The apparatus comprises: a processor that comprises an input and an output, the processor being configured to carry out a treatment process; and a gravimetric selector that comprises an input, a waste stream output and a recycle stream output, wherein the recycle stream output of the gravimetric selector is coupled to the input of the processor.

The input of the gravimetric selector may be coupled to the output of the processor.

The input of the gravimetric selector may be coupled to an underflow output of a separator.

The recycle stream output of the gravimetric selector may supply a recycle stream to the processor, the recycle stream may comprise solids with superior settling characteristics.

The treatment process may comprise: a suspended growth activated sludge process; a granular process; an integrated fixed-film activated sludge process; a biological nutrient removal process; an aerobic digestion process; or an anaerobic digestion process.

The processor may comprise a bioreactor process. The bioreactor process may comprise an in-line solid to liquid separation process.

The processor may comprise a cyclone that accelerates the wastewater and provides shear-force to the wastewater to separate solids with good settling characteristics from solids with poor settling and filtration characteristics.

The processor may comprise a centrifuge that provides centrifugal and shear force to separate solids with good settling characteristics from solids with poor settling and filtration characteristics in the wastewater.

The feed rate a geometry of the cyclone may be configured to adjust a velocity of the wastewater in the cyclone to: select for larger or more dense solids; or increase a time available for separation in the cyclone.

The apparatus may further comprise a separator that has an input coupled to the output of the processor.

The cyclone may control a velocity of the wastewater to adjust an overflow rate so that settling solids of a predetermined size or density are retained.

The cyclone may control a hydraulic loading rate to select settling solids of a predetermined size or density.

According to a still further example of the disclosure, a method is provided for selecting and retaining solids with superior settling characteristics, where the method comprises: receiving wastewater from a wastewater supply; processing the wastewater to provide processed wastewater; gravimetrically selecting solids with settling characteristics from the processed wastewater; and supplying the selected solids to a processor to further process the selected solids together with further wastewater received from the wastewater supply.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The terms "including," "comprising" and variations thereof, as used in this disclosure, mean "including, but not limited to," unless expressly specified otherwise.

The terms "a," "an," and "the," as used in this disclosure, means "one or more", unless expressly specified otherwise.

Although process steps, method steps, or the like, may be described in a sequential order, such processes and methods may be configured to work in alternate orders. In other words, any sequence or order of steps that may be described does not necessarily indicate a requirement that the steps be performed in that order. The steps of the processes or methods described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Figure 1:
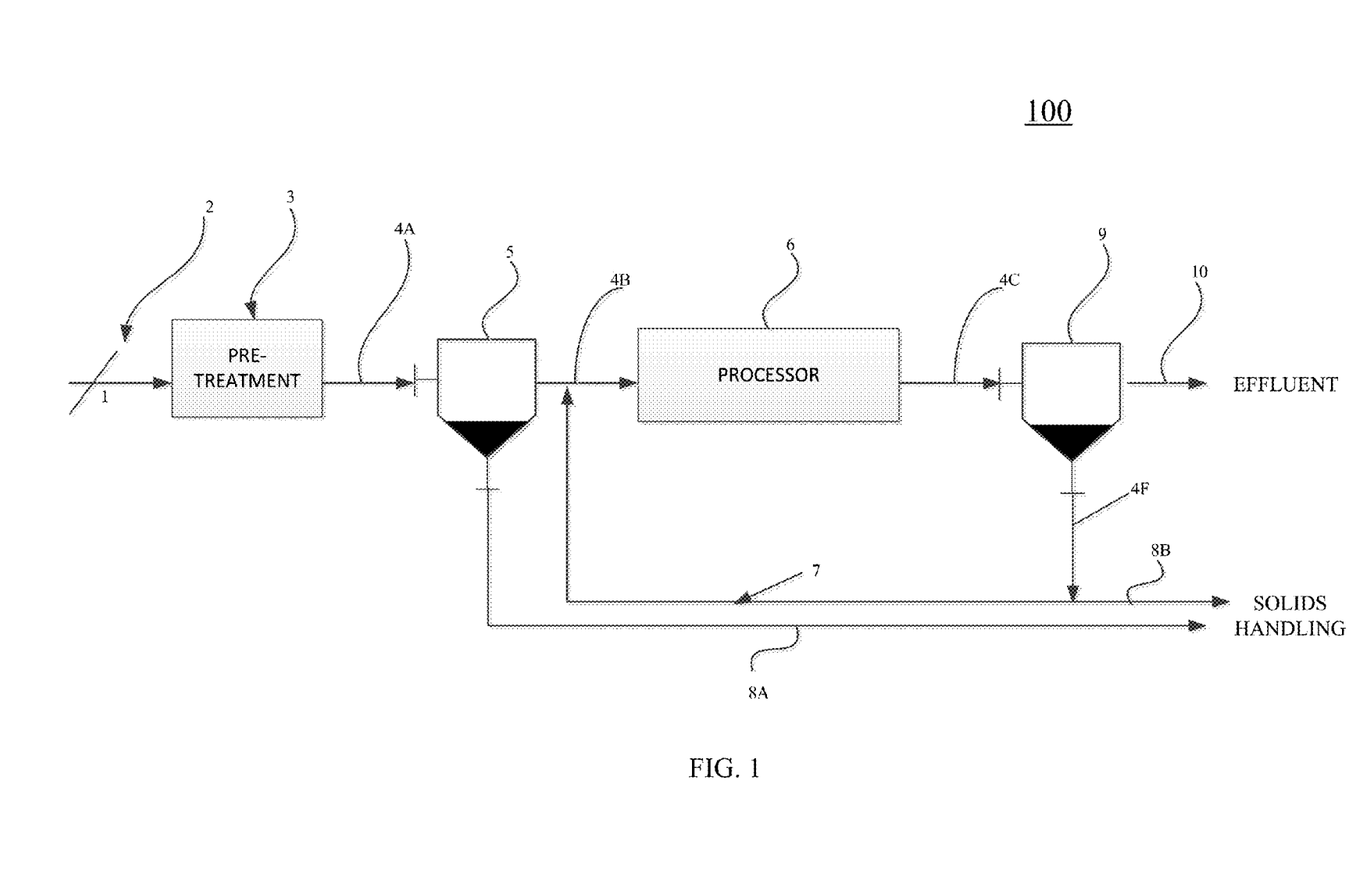
FIG. 1 shows an example of an activated sludge process where the wasting of sludge occurs via a waste stream taken from the underflow of a clarifier, according to the prior art.

FIG. 1 shows an example of an activated sludge process and a system 100 for carrying out the activated sludge process. The system 100 may include pretreatment, which may include a bar screen 2, a grit remover (not shown), a pre-treatment chamber 3, and an influent pump (not shown). The system 100 may further include a primary separator 5, a processor 6, and a secondary separator 9. The system 100 may receive wastewater 1 from an external source (not shown), such as, e.g., a sewage system, and process the wastewater 1 in a pretreatment stage which may include, e.g., a bar screen 2 to remove larger objects such as cans, rags, sticks, plastic packets, and the like, from the wastewater 1. The pretreatment stage may also include a pretreatment chamber 3, which may contain, e.g., a sand or grit chamber, to adjust the velocity of the incoming wastewater 1 and thereby allow the settlement of, e.g., sand, grit, stones, broken glass, and the like. The pre-treatment chamber 3 may be replaced by, e.g., a sand or grit channel. The pretreatment stage may further include a small tank for removal of, e.g., fat, grease, and the like.

Following the pretreatment stage, the remaining solid-liquid mixture 4A, which includes excess wastewater containing accumulated solids, may be sent to a primary separator 5 for gravity settling. The primary separator 5 may include a tank (e.g., a clarifier tank, a sediment tank, etc.), which may have one of a variety of shapes, such as, e.g., rectangular, cone shape, circular, elliptical, and so on. The primary separator 5 may have a chemical or ballast material added to improve solids removal. The primary separator 5 settles the heavier solids from the solid-liquid mixture 4A. The resulting underflow 8A may be output from the primary separator 5 and sent to solids handling for further treatment, such as, e.g., thickening, stabilization, conditioning, dewatering, sludge processing, and so on, as is known by those having ordinary skill in the art.

The resulting solid-liquid mixture 4B containing soluble organic and inorganic contaminants and particulate materials may then be sent to the processor 6. The processor 6 may include a bioreactor. The processor 6 may include an aeration tank (not shown) and live aerobic and facultative bacteria. Air may be added to the mixture 4B to feed a bioreaction process (where aerobic bacteria are grown) in the processor 6. The aerobic bacteria will digest organic material in the presence of the dissolved oxygen.

The processor 6 may further include a membrane module (not shown) for separating relatively pure water from the suspension of organic matter and bacteria. If the membrane module is included in the processor 6, then the separator 9 may be omitted from the systems 200 (shown in FIG. 2) and 300 (shown in FIG. 3). The aerobic bacteria and the membrane module may be set up to run in succession in the membrane bioreactor (MBR). For example, the solid-liquid mixture may flow first through the bioreactor, where it may be held for as long as necessary for the reaction to be completed, and then through the membrane module.

The air may be added to the processor 6 via any known method that can supply air to the solid-liquid mixture 4B. A common method is through the addition of compressed air to fine bubble diffusers (not shown) constructed of perforated flexible membrane materials including EPDM and polyurethane. The processor 6 outputs an oxygenated solid-liquid mixture commonly known as mixed liquor 4C, which is then forwarded to the secondary separator 9, The secondary separator 9 separates the solid-liquid mixture 4C to produce an underflow 4F, which may then be recycled as part of a separated sludge 7 and sent back to the bioreactor 6, and clarified wastewater as an effluent 10. A portion of the underflow biomass 8B (or mixed liquor) may be wasted from the process and sent to solids handling for further treatment, such as, e.g., thickening, stabilization, conditioning, dewatering, sludge processing, and so on, as is known by those having ordinary skill in the art Alternatively, the processor 6 may include a membrane (not shown) that may be suspended in the slurry in the processor 6 (instead of the secondary separator 9), which may be appropriately partitioned to achieve the correct airflow, with the surplus withdrawn from the base of the processor 6 at a rate to give the required sludge retention time (SRT).

Figure 2:
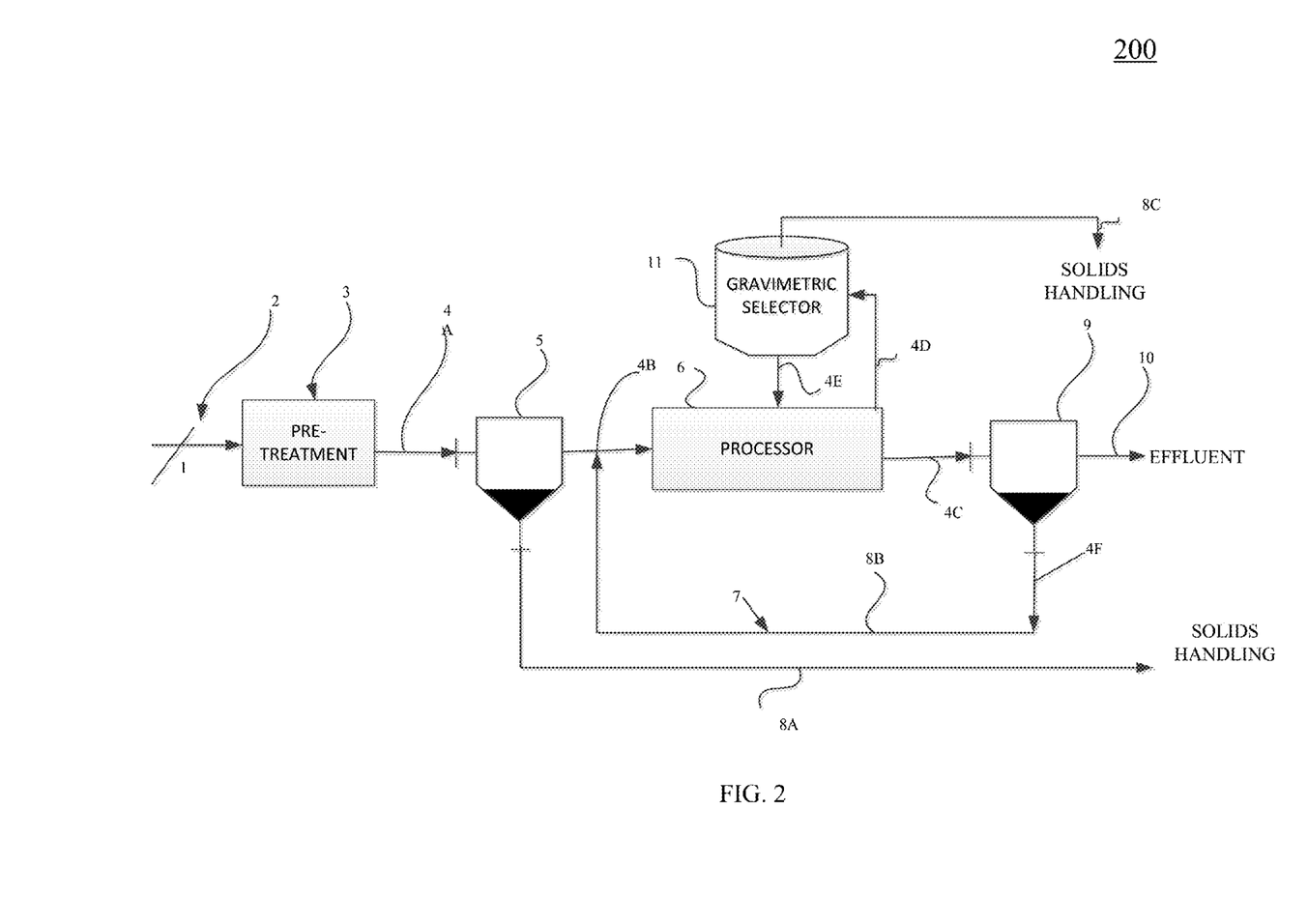
FIG. 2 shows an example of an activated sludge process according to the principles of the disclosure where the waste stream is taken directly from the reactor tank and applied to a gravimetric selector, with more dense and large particles are returned to the reactor and the lighter fraction, representing the wasted solids, are taken from the system.

It is noted that instead of, or in addition to the processor 6, the system 200 may include, e.g., a granular sludge process, an integrated fixed-film activated sludge process, a biological nutrient removal process with various anaerobic, anoxic and aerobic zones with associated internal recycles, an aerobic digestion process, an anaerobic digestion process, and the like, as is known in the art.

FIG. 2 shows an example of a system 200 for carrying out the activated sludge process that is constructed according to the principles of this disclosure. The system 200 may include a similar set up as system 100. The system 200 may include a cyclone (not shown), a hydrocyclone (not shown), a centrifuge (not shown), a sedimentation tank (not shown), a sedimentation column (not shown), a filter (not shown), and the like. Further to the components in the system 100, the system 200 includes a gravimetric separator 11. The system 200 has the ability to select for good settling solids by means of gravimetric selection in the gravimetric selector 11 through, e.g., direct wasting from the mixed liquor (or oxygenated solid-liquid mixture 4D). Good settling solids may include solids that exhibit a sludge volume index (SVI) of, e.g., less than 120 mL/gm, and preferably less than or equal to 100 mL/gm.

The gravimetric selector 11 may include, e.g., a clarifier, a settling tank, a cyclone, a hydrocyclone, a centrifuge, and the like. The gravimetric separator 11 may include an input and a plurality of outputs, including a waste stream output and a recycle stream output. The gravimetric separator 11 may be positioned to receive the oxygenated solid-liquid mixture or mixed liquor 4D at its input from an output of the processor 6. Alternatively (or additionally), the stream 4C may be input to the gravimetric selector 11. During operation, the gravimetric selector 11 may classify, separate and/or sort particles in the mixture 4D, which may include a liquid or liquid-solid suspension, based on, e.g., the ratio of the centripetal force to fluid resistance of the particles. The gravimetric selector 11 may separate good settling solids from the mixture 4D and output the solids at its recycle stream output as an underflow 4E, which may be fed back to the processor 6 for further processing (e.g., bioreaction, digestion, etc.). The gravimetric selector 11 may output the remaining liquid/liquid-suspension at its waste stream output as a waste stream 8C, which may contain smaller particles and colloids that have the potential to cause MBR membrane fouling, cause turbidity in effluent 10, and induce membrane air diffuser fouling, that may be output from the system for further treatment such as, e.g., sludge processing, dewatering, and so on.

Figure 3:
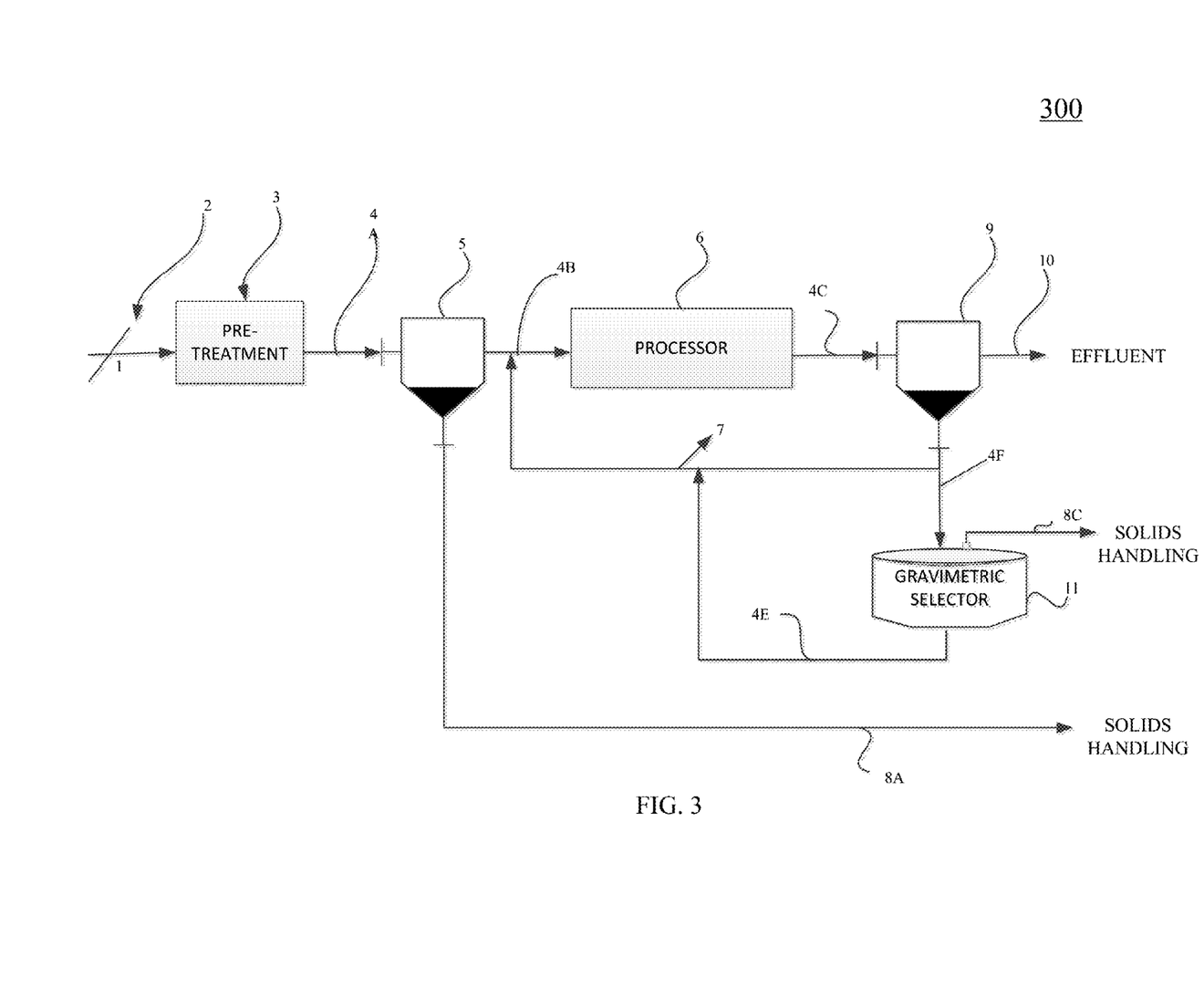
FIG. 3 shows an activated sludge process according to the principles of the disclosure where the waste stream is taken from the underflow of a clarifier and applied to a gravimetric selector, with the large and more dense particles returned to the reactor and the lighter fraction representing the wasted solids taken from the system.

FIG. 3 shows yet another example of a system 300 for carrying out the activated sludge process that is constructed according to the principles of this disclosure. The system 300 may include a similar set up as system 100. Further to components in system 100, the system 300 may include the gravimetric selector 11, which may be positioned so as to receive an underflow 4F at its input from an output of the secondary separator 9. The system 300 has the ability to select for good settling solids by means of gravimetric selection in the gravimetric selector 11 through, e.g., direct wasting from the more concentrated return sludge 7.

The gravimetric selector 11 may process the underflow 4F, separating heavier solids from the liquid-solid mixture and outputting the heavier solids as underflow 4E at the recycle stream output and the resulting overflow 8C at the waste stream output of the gravimetric selector 11. The overflow 8C may be forwarded to solids handling for further treatment such as, e.g., stabilization, dewatering, and so on. The underflow 4E may be recycled together with the separated sludge 7 and returned to the processor 6 for further processing.

According to an alternative aspect of the disclosure, wasting of a portion (or all) of the sludge can occur directly from the underflow of the secondary separator 9, which is not shown in the figures.

The gravimetric selector 11 may include any one or more gravity separation devices for selecting and separating solids from a liquid-solid mixture, including, for example, a settling tank, a settling column, a cyclone, a hydrocyclone, a centrifuge, and/or the like. In the gravimetric selector 11, the overflow rate, which is also called the rise rate, can be used as a parameter in selecting good settling solids from the liquor (or sludge). This overflow rate can be adjusted to increase the wasting of poor settling solids, while only retaining good settling solids. An increase in the overflow rate can promote the selection for good settling solids until a certain point is reached, when the detention time is insufficient for proper classification of the solids. The target overflow rate of the gravity selection device should be based on the desired SRT of the process, and the associated need to remove a particular mass of biomass from the system. The specific overflow rate must be tuned to the particular device used, but would generally be expected to be 10 to 100 times the overflow rate of the secondary separation process 7.

Hydrocyclone separation occurs under pressure, and a pressure drop may be used as the energy source for separation. Accordingly, if the gravimetric selector 11 includes a hydrocyclone, the hydrocyclone should be configured so that the input is positioned to feed the incoming liquid-solid mixture tangentially in the hydrocyclone to develop a high radial velocity. Further, the hydrocyclone may have a tapered shape. Hence, a spinning motion may be initiated and acceleration of the fluid may result from the tapered shape of the hydrocyclone. This creates a shear-force that improves settling characteristics of particles by actions such as, e.g., destruction of filaments or displacement of interstitial or bound water. A change in the initial velocity and/or the diameter (size) of the cyclone may result in the selection of different separation rates of desired solids fractions, or conversely results in overflow of non-desirables.

Figure 4:
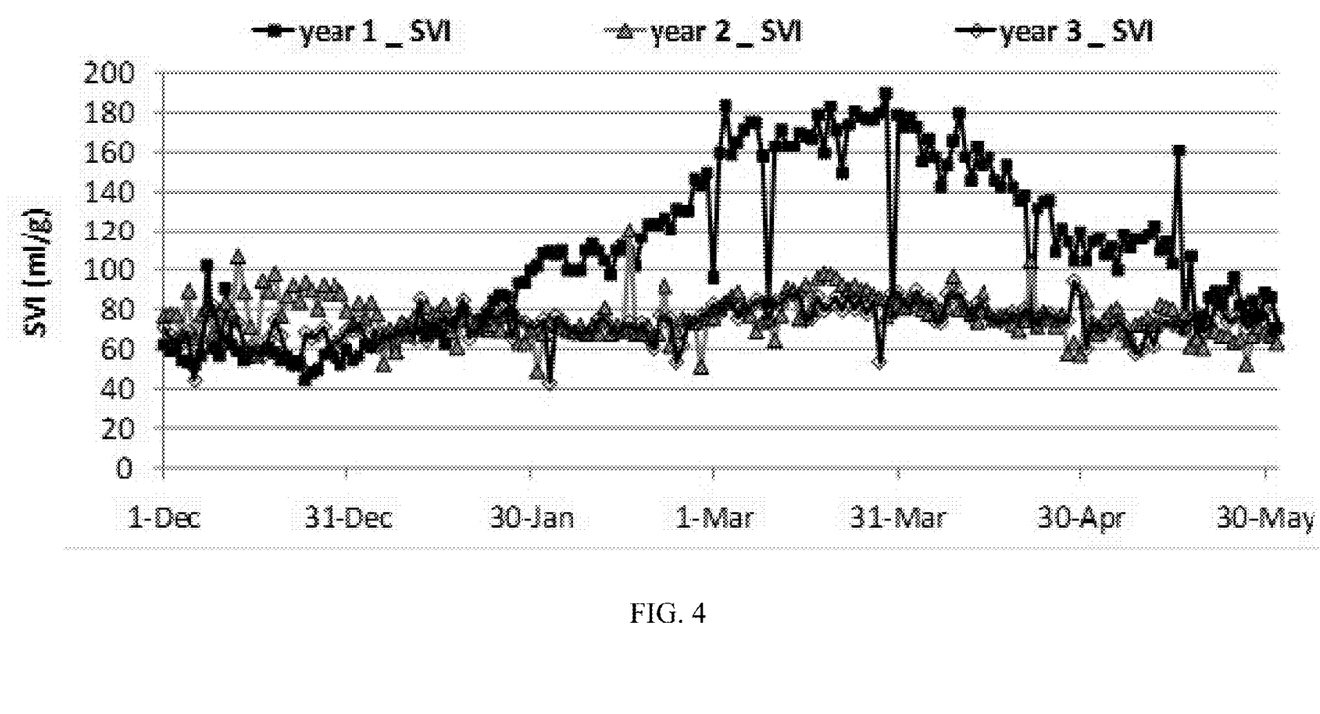
FIG. 4 shows a graph comparing the typical deterioration of sludge settling properties with the improved settling performance of the activated sludge processes of FIG. 2 or 3.

For example, a pair of hydrocyclones may be installed in the waste sludge line of the system 200 (or 300) and configured for a wasting rate of, e.g., about 20 m$^3$/hr each. The pressure may be set to, e.g., about 1.7 bar. An online pressure sensor (not shown) may be included in the system 200 (or 300), which may provide a control signal for the frequency drive of, e.g., a pump (not shown), which may also be included in the system 200 (or 300). The underflow nozzle(s) in the system 200 (or 300) may have a diameter of, e.g., about 25 mm, thereby reducing any likelihood of vulnerability to clocking. FIG. 4 show SVI (mL/g) versus time charts for this example.

Figure 6:
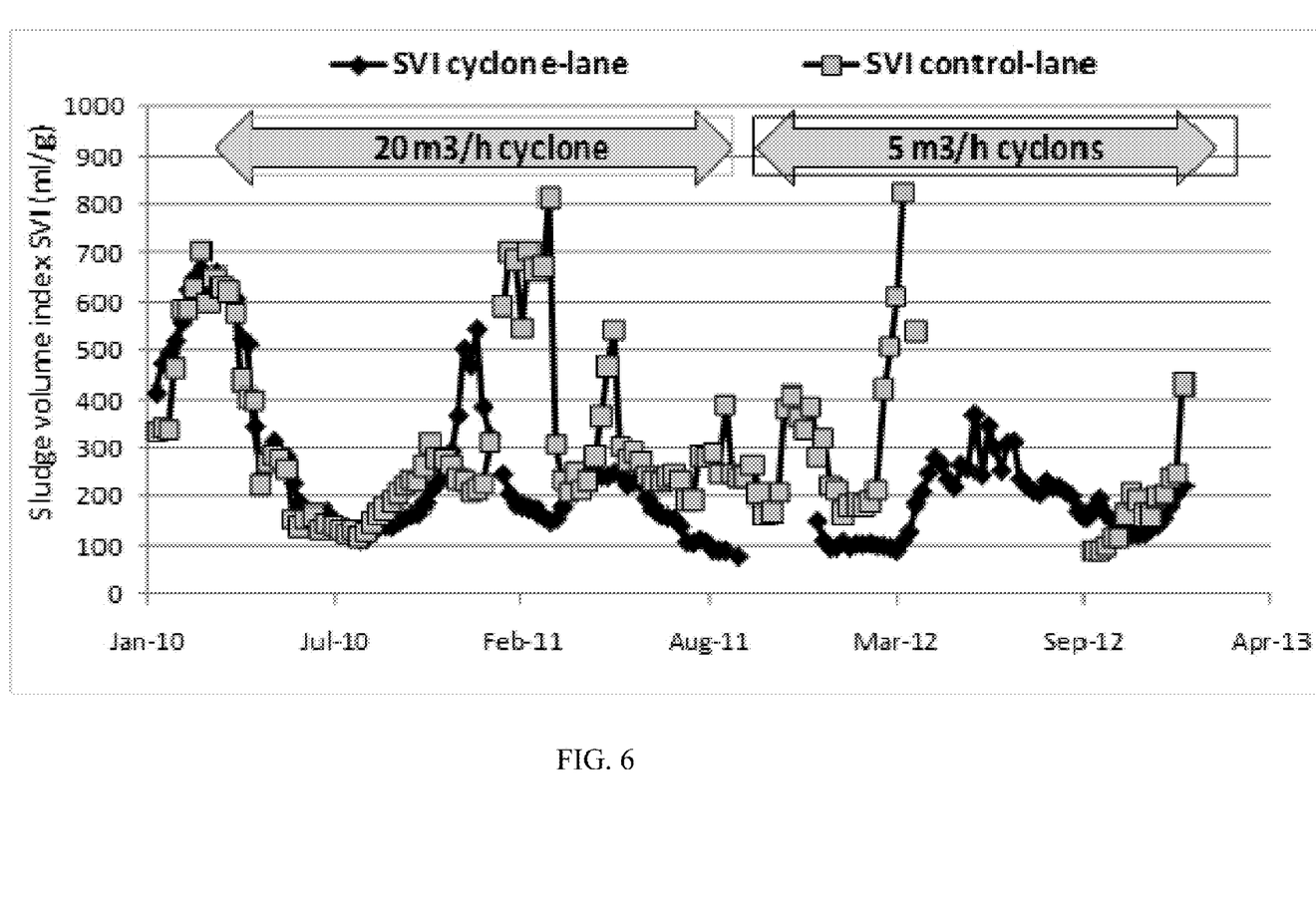
FIG. 6 shows a Sludge Volume Index (SVI) versus time chart for an activated sludge process according to the principles of the disclosure.

According to another example, a plurality of cyclones (e.g., a battery of seven cyclones) may be installed in the system 200 (or 300). Each of the cyclones may be configured for a flow rate of 5 m$^3$/hr. The pressure may be set to, e.g., about 2.1 bar and the diameter of the underflow-nozzle(s) may be set to, e.g., about 22 mm. The system 200 (or 300) may include one or more inline sieves of, e.g., about 5 mm width to protect the cyclone(s) from clogging. FIG. 6 shows an SVI (mL/g) versus time charge for this example.

Centrifuge separation often occurs using a solid bowl centrifuge, where an increase in rpm of the centrifuge (e.g., in the range of 500-5000 rpm) increases the gravitational force and thus the settling rate. Accordingly, if the gravimetric selector 11 includes a centrifuge that has a bowl, scroll and pond sections, the centrifuge may expose the liquid-solid mixture in the gravimetric selector 11 to many times the gravitational force that may occur, e.g., in a settling tank. A very small differential rpm (e.g., usually in the range of 1-10 rpm) between the bowl and the centrifuge scroll in the centrifuge can be used to separate the better settling solids from the poorer settling solids that are discharged in the overflow pond section of the centrifuge. Accordingly, by controlling hydraulic loading rate, centrifuge rotational speed, bowl/scroll differential rpm, and managing these rates between predetermined thresholds, the selection of larger and/or more dense solids may be controlled. For example, an increase in the hydraulic loading rate or bowl/scroll differential rpm may improve election of larger and/or more dense solids, while a decrease in these rates may help to increase retention time available for gravimetric separation, and a balanced rate may be used to manage the process. The solids in the pond section are wasted and the heavier scrolled solids can be retained and returned to the processor 6.

An important characteristic of the gravimetric selector 11 is its capability of using an aggressive overflow rate to retain good settling solids in separate equipment associated with a solids waste stream. These good settling solids tend to be both more dense and larger, with the better settling being based on Stokian settling which allows for rapid removal of the material in the gravimetric selector 11. Another important characteristic is the selective removal of smaller particles and colloids from the liquid/liquid-solid mixture that have the potential to cause MBR membrane fouling and/or turbidity in effluent 10, and induce membrane air diffuser fouling in, e.g., the processor 6.

U. S. Patent Application Publication No. US 2013/0001160 discloses a method for the biological purification of ammonium-containing wastewater, which is hereby incorporated herein in its entirety. The disclosed method provides gravimetric separation (e.g., using a hydrocyclone, a centrifuge, or sedimentation) of heavy sludge phase containing slow-growing anaerobic ammonia oxidizing bacteria (AN-AMMOX) from light sludge phase and returning the heavy sludge phase to the aeration reactor treating ammonia containing wastewater while feeding light phase sludge to a digester for gas production.

Figure 5:
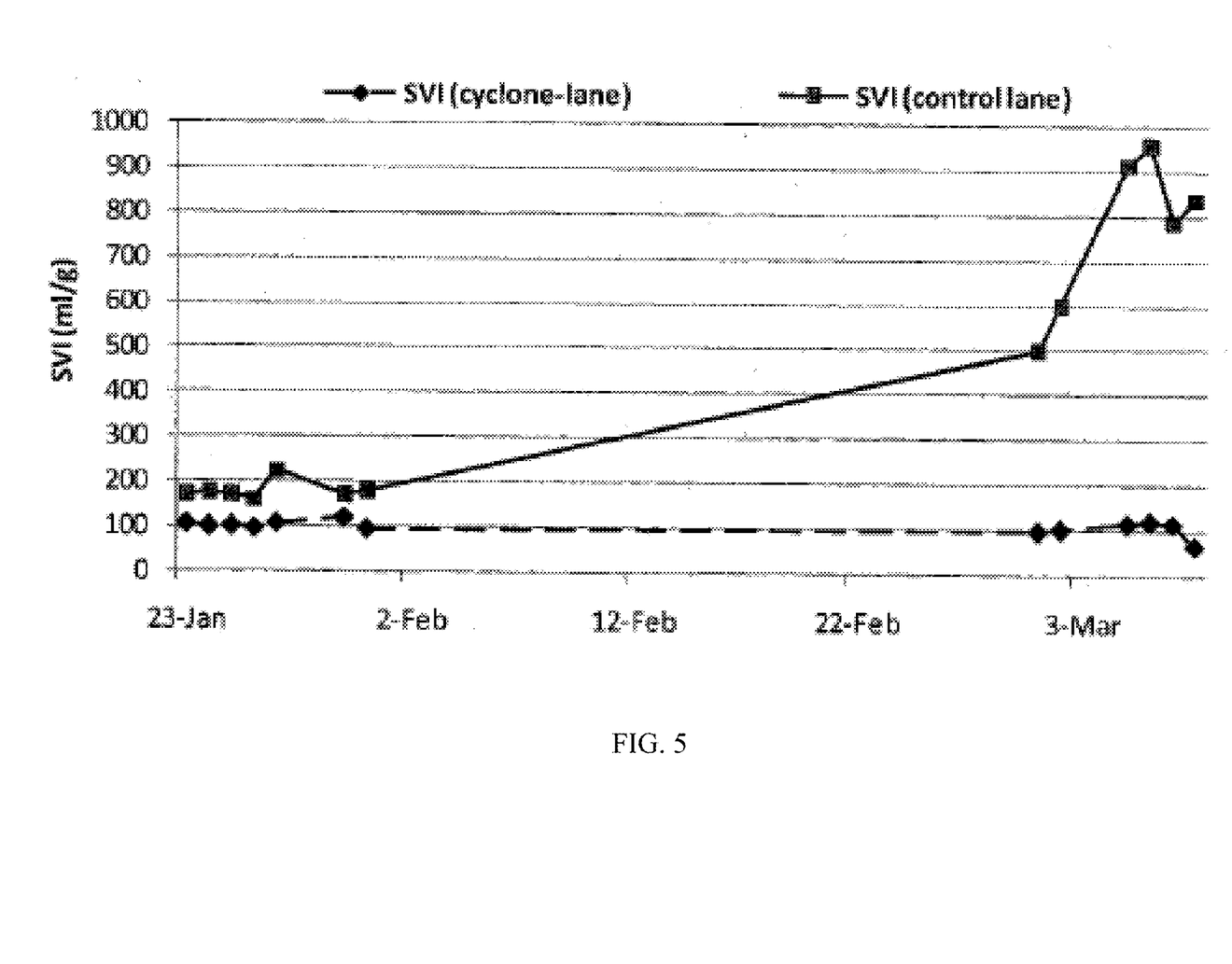
FIG. 5 shows a graph comparing the deterioration of sludge settling properties at one process lane in a typical system with improved settling performance of a parallel lane according to the principles of the disclosure.

FIGS. 4-6 illustrate improvements in the sludge settling properties resulting from implementation of the principles of the disclosure, including implementation of the system 200 (shown FIG. 2) or 300 (shown in FIG. 3). The sludge volume index (SVI) represents the volume of a sludge blanket settled for 30 minutes in a test cylinder normalized to one gram of solids and is a standard measure of settleability. Often a SVI greater than 150 mL/g is an indicator of poor settleability of sludge and an SVI less than 120 mL/gm, and preferably less than or equal to 100 mL/gm is an indicator of good settleability. Settleability of sludge determines the maximum mixed liquor solids operation that can be operated in an activated sludge plant. Even at many well operated treatment plants, the settling performance tends to deteriorate during certain periods of the year e.g., typically at the end of the winter season.

As seen in FIGS. 4-6, the use of the gravimetric selector 11 provides and maintains a good settleability, such as, e.g., less than 120 mL/gm, and preferably less than or equal to about 100 mL/gm.

FIG. 4 shows a graph comparing the deterioration of sludge settling properties in the process of system 100 with the improved settling performance of the activated sludge processes of systems 200 and 300. This graph demonstrates the benefits of implementing the gravimetric selector 11 according to the principles of the disclosure. In particular, the graph illustrates a comparison of settling properties using the system 200 (or 300) as compared to the settling properties using the system 100 (shown in FIG. 1), which does not include the gravimetric selector 11. In particular, this graph displays results where a pair of cyclones are installed in the waste sludge line of the system, and where the cyclones are designed for a wasting rate of 20 m$^3$/hr each at a pressure of 1.7 bar with a 25 mm diameter underflow-nozzle, as noted earlier.

In FIG. 4, the graph compares the deterioration of sludge settling properties in the system during the winter-spring season (e.g., December 1 to May 30) for a three year period. As seen in the graph, although the SVI reached levels of up to about 190 mL/g at the end of the winter season, with the improved settling performance during the same period for the SVI remained below 100 mL/g using the system 200 (or 300).

FIGS. 5 and 6 show graphs comparing the deterioration of sludge settling properties at one process lane in a typical system with improved settling performance of a parallel lane in the system 200 (or 300). In particular, the graphs display results from a full-scale pilot test at the WWTP Glarnerland plant where a battery of 7 cyclones were installed, each designed for a flow rate of 5 m$^3$/hr. The design pressure was set to 2.1 bar and the diameter of the underflow-nozzle was set to 12 mm. An inline sieve of 5 mm width was installed to protect the cyclone from clogging. The results show comparison of the deterioration of sludge settling properties (SVI over 900 ml/g) at one liquid process lane with the improved settling performance of the parallel lane during an experimental period (SVI remains constant around 100 mL/g). At the WWTP Glarnerland, the performance comparison appears more direct where one treatment train was operated without the gravimetric selector and the other parallel one was operated with a gravimetric selector as seen in system 200 (or 300) during the same period.

In FIG. 6, the graph also displays the results from a test at the WWTP Strass plant where a pair of cyclones were installed in the waste sludge line designed for a wasting of 20 m$^3$/hr each. The design pressure was set to 1.7 bar and an online pressure sensor was included to provide the control signal for the frequency drive of the pump used in the system. Due to the size of the underflow-nozzle, which had a diameter of 25 mm, no vulnerability to clogging was observed.

As evident from FIGS. 4-6, the application of the gravimetric selector 11 in system 200 (or 300) may mitigate the deterioration of settling performance that would otherwise occur and which would otherwise lead to operational problems and to a bottle-neck in design.

An activated sludge process may include a bioreactor that may be used for the treatment of wastewater. The activated sludge process may further include alternative processes for treatment of wastewater e.g., a granular process, an integrated fixed-film activated sludge process, an aerobic digestion process, an anaerobic digestion process, and so on. Any of these processes can be connected to a separation device utilizing gravimetric separation for the recycling or removal of biomass.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed is:

1. A method for wastewater treatment, comprising:
    feeding wastewater to an input of a processor that carries out a treatment process on the wastewater;
    treating the wastewater in the processor;
    outputting processed wastewater at an output of the processor;
    feeding the processed wastewater to an input of a gravimetric selector;
    selecting, at the gravimetric selector, first solids exhibiting a sludge volume index (SVI) of less than about 120 mL/gm;
    outputting a recycle stream at a first output of the gravimetric selector;
    outputting a waste stream that comprises solids other than said first solids at a second output of the gravimetric selector to solids handling, where solids handling includes at least one of thickening, stabilizing, conditioning, and dewatering; and
    supplying the recycle stream to the processor,
    wherein the feeding of the processed wastewater to the input of the gravimetric selector comprises:
        feeding the processed wastewater to an input of a separator that separates the wastewater into an underflow and effluent,
        receiving the underflow from the separator, and
        gravimetrically selecting the first solids from the underflow and supplying the recycle stream to the first output.

2. The method of claim 1, wherein the recycle stream comprises the first solids.

3. The method of claim 1, wherein the waste stream is rejected.

4. The method of claim 1, wherein the treatment process comprises:
    a suspended growth activated sludge process;
    a granular process;
    an integrated fixed-film activated sludge process;
    a biological nutrient removal process;
    an aerobic digestion process;
    an anaerobic digestion process; or
    a biological treatment process.

5. The method of claim 4, wherein said biological treatment process comprises an in-line solid-liquid separation process.

6. A method for wastewater treatment, comprising:
    feeding wastewater to an input of a processor that carries out a treatment process on the wastewater;
    treating the wastewater in the processor;
    outputting processed wastewater at an output of the processor;
    feeding the processed wastewater to an input of a gravimetric selector;

selecting, at the gravimetric selector, first solids with predetermined settling and filtration characteristics;

outputting a recycle stream at a first output of the gravimetric selector;

supplying the recycle stream to the processor, wherein the processor includes a membrane separator; and outputting, at the gravimetric selector, solids other than said first solids.

7. The method of claim 1, wherein the gravimetric selector comprises a cyclone that separates the first solids from second solids exhibiting an SVI of more than about 120 mL/gm.

8. The method of claim 1, wherein the gravimetric selector comprises a centrifuge to separate the first solids from second solids exhibiting an SVI of more than about 120 mL/gm in the wastewater.

9. The method of claim 7, wherein a feed rate to and a geometry of the cyclone are configured to:

select for larger or more dense solids; or increase the time available for separation in the cyclone.

10. The method of claim 7, further comprising:

controlling a hydraulic loading rate to select settling solids of a predetermined size or density.

11. An apparatus for wastewater treatment, comprising:

a processor that comprises an input and an output, the processor being configured to carry out a treatment process;

a gravimetric selector that comprises an input, a waste stream output and a recycle stream output; and a separator that comprises an input and an underflow output, the separator being configured to receive a solid-liquid mixture from the processor and produce an underflow, wherein the gravimetric selector is configured to select first solids exhibiting a sludge volume index (SVI) of less than about 120 mL/gm, wherein the gravimetric selector is further configured to output solids other than said first solids at the waste stream output, wherein the recycle stream output of the gravimetric selector is coupled to the input of the processor, and wherein the input of the gravimetric selector is coupled to either the output of the processor or to the underflow output of the separator.

12. The apparatus of claim 11, wherein the recycle stream output of the gravimetric selector supplies a recycle stream to the processor, the recycle stream comprising the first solids.

13. The apparatus of claim 11, wherein the treatment process comprises:

a suspended growth activated sludge process;

a granular process;

an integrated fixed-film activated sludge process;

a biological nutrient removal process;

an aerobic digestion process; or an anaerobic digestion process.

14. An apparatus for wastewater treatment, comprising:

a processor that comprises an input and an output, the processor being configured to carry out a treatment process;

a gravimetric selector that comprises an input, a waste stream output and a recycle stream output; and a separator that comprises an input and an underflow output, the separator being configured to receive a solid-liquid mixture from the processor and produce an underflow, wherein the gravimetric selector is configured to select first solids having predetermined settling and filtration characteristics, wherein the gravimetric selector is further configured to output solids other than said first solids at the waste stream output, wherein the recycle stream output of the gravimetric selector is coupled to the input of the processor, wherein the input of the gravimetric selector is coupled to either the output of the processor or to the underflow output of the separator, and wherein the processor comprises a bioreactor that includes an in-line solid to liquid separation process.

15. The apparatus of claim 11, wherein the gravimetric selector comprises a cyclone or a centrifuge that separates the first solids from second solids exhibiting an SVI of more than about 120 mL/gm.

16. The apparatus of claim 15, wherein a feed rate and a geometry of the cyclone are configured to:

select for solids with a predetermined size or a predetermined density; or increase a time available for separation in the cyclone.

17. A method for wastewater treatment, the method comprising:

receiving wastewater from a wastewater supply;

processing the wastewater in a processor to provide processed wastewater;

supplying the processed wastewater to a separator that separates the processed wastewater into an underflow and an effluent;

gravimetrically selecting first solids exhibiting a sludge volume index (SVI) of less than about 120 mL/gm from the processed wastewater and outputting a recycle stream and a waste stream that comprises solids other than said first solids;

supplying the recycle stream as an input to the processor to further process the selected first solids in the recycle stream together with further wastewater received from the wastewater supply; and supplying the waste stream to solids handling, wherein the solids handling includes at least one of thickening, stabilizing, conditioning, and dewatering.

18. The method of claim 1, wherein the processor includes a membrane separator.

19. The apparatus of claim 11, wherein processor comprises a bioreactor that includes an in-line solid to liquid separation process.

20. The method of claim 6, wherein the waste stream comprises solids with poor settling and filtration characteristics or that have increased potential for membrane fouling.

* * * * *